INVENTOR
JOSEPH SAVIO
BY Mock & Blum
ATTORNEYS.

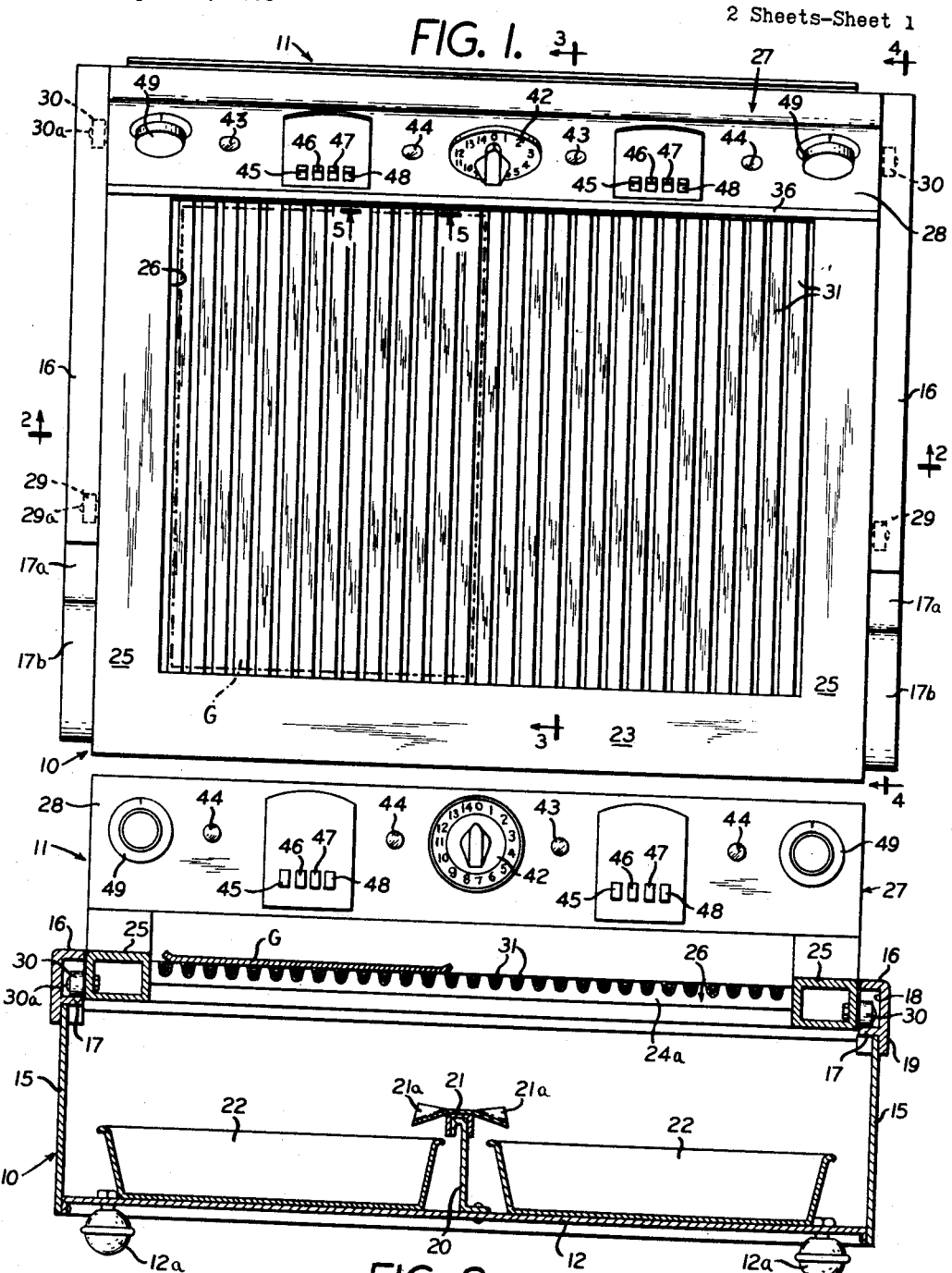

United States Patent Office 2,938,102
Patented May 24, 1960

2,938,102
ELECTRIC COOKING APPARATUS
Joseph Savio, Floral Park, N.Y., assignor to Electro-Char Corporation, New York, N.Y., a corporation of New York Filed Apr. 9, 1958, Ser. No. 727,310
6 Claims. (Cl. 219—37)

This invention relates to improvements in electric cooking devices and in particular relates to an electrified grate suitable for cooking meat and other foods directly upon the heating elements thereof.

An important object of this invention is to provide an electrified grate or the like having improved means for sealing the cooking surfaces of the heating elements thereof from the electrical contacts of said heating elements. Another important object of this invention is to provide an electrified grate or the like having improved means for regulating the temperature of the heating elements, said regulating means being directly responsive to the temperature of the surface of said heating elements. As an important feature of this invention, as the result of the accomplishment of these two objects, I have found it possible to cook meat and other foods directly upon the heating elements of an electric stove or the like.

Another important object of this invention is to provide an electrified grate or the like which may be readily cleaned and repaired.

Another important object of this invention is to provide a cooking device which will operate at relatively low heat levels and which will minimize the risk of fires. Since in accordance with this invention it is possible to cook food directly upon the electrified grate, it is possible to use less heat than if the heat were supplied from a source which is spaced from the food. Furthermore, fat or the like which drips from the food drips below the source of heat, rather than dripping upon the source of heat itself (as is the case, for instance, when a charcoal pit is used), thereby minimizing the risk of the fat catching on fire.

In accordance with this invention, charring of the food is minimized, while at the same time the distinctive flavor of charcoal broiling can be imparted to meats.

Other objects and advantages of the invention will become apparent from the following description, in conjunction with the annexed drawings, in which a preferred embodiment of the invention is disclosed.

In the drawings,

Fig. 1 is a top plan view of a preferred embodiment of my invention.

Fig. 2 is a section on line 2—2 of Fig. 1.

Figure 3:
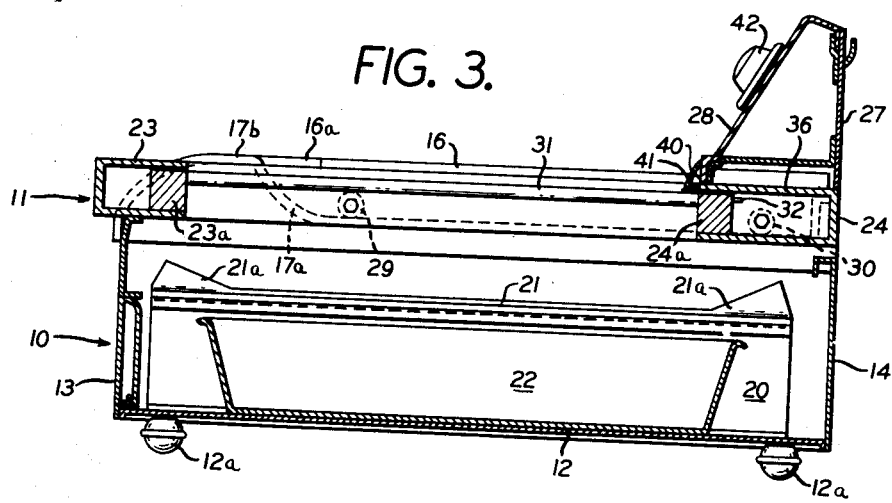
Fig. 3 is a section on line 3—3 of Fig. 1.

Upon reference to the drawings in detail, it will be noted that the cooking device shown in the drawing is of generally rectangular shape and has a base frame 10 and a top frame 11 removably mounted upon said base frame 10. The heating and electrical elements of the stove are preferably mounted upon the removable top frame 11, with the base frame 10 serving as a support and also serving to hold drip pans.

Said base frame 10 has a bottom wall 12, laterally extending front wall 13 and rear wall 14 and longitudinally extending side walls 15. Said base frame 10 preferably has an open top. Wall 12 is optionally supported by legs 12a. A longitudinally extending bracket 19 is mounted upon the upper edge of each side wall 15, by any suitable means. Said bracket 19 has an inturned top flange 16 and a further inturned flange 17 located somewhat below flange 16, so as to define a longitudinal channel 18 between flanges 16 and 17.

Said channel 18 extends from substantially the rear of base frame 10 to a point near the front thereof. At this point, flange 16 terminates and flange 17 is upwardly forwardly inclined at 17a to connect with a flange portion 17b, the rear portion of which is located in substantially the same plane as flange 16 and is spaced forwardly thereof to define an opening 16a. Said flange portion 17b is of convex shape and is forwardly downwardly curved to define a cam surface.

Optionally, a longitudinal partition wall 20 is mounted upon the bottom 12 of base frame 10, by any suitable means. A deflector 21 is optionally and preferably mounted upon the upper end of partition wall 20, and is substantially co-extensive therewith. The side portions 21a of deflector 21 are optionally downwardly outwardly inclined. A pair of generally rectangular drip pans 22, having open tops, can be releasably placed upon bottom wall 12 on opposite sides of partition 20, with the deflector portions 21a extending outwardly of the proximate sides of the pans 22. As a result, drippings from the top frame member 10 either fall directly on the drip pans 22 or are deflected therein by deflector 21.

The top frame member 10 is of generally rectangular shape and has front and rear cross-pieces 23 and 24, as well as longitudinal side arms or pieces 25. These elements cooperate to define a frame having a central opening 26.

Said members 23, 24 and 25 may be of any suitable rigid construction and are optionally of hollow rectangular shape, as is clearly shown in Figs. 2 and 3.

A control unit 27 is mounted by any suitable means upon the top of rear cross-piece 24, said unit 27 including an upwardly rearwardly inclined front panel 28.

Figure 4:
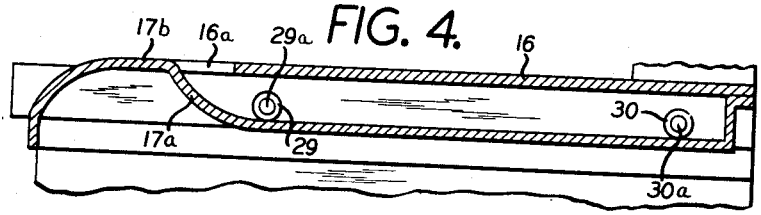
Fig. 4 is a section on line 4—4 of Fig. 1.

The whole frame 10 is provided with front and rear rollers 29 and 30 mounted by means of pivots 29a and 30a upon the respective sides thereof so as to be turnable about lateral axes. Said frame 11 may be removably mounted upon frame 10 by extending the respective rear rollers 30 into openings 16a and down upon the track flanges 17. Frame 10 may then be rolled rearwardly until the front rollers 29 ride upon the cam flanges 17b and then drop downwardly through openings 16a into channels 18 and onto the flanges 17, to the position shown in Fig. 4 and in other views. It will be apparent that frame 10 may be readily removed for cleaning or other purposes. Optionally, also, only rollers 29 may be removed from channels 18; and frame 10 may then be swung to vertical positions.

In the mounted position, the top face of frame 11 is approximately on a level with the top edges of flanges 16, as is shown in Fig. 2.

A plurality of elongated, optionally straight electric heating grate elements 31 are mounted upon frame 11. These heating elements 31 are laterally spaced from each other and extend longitudinally. Said heating elements 31 are made of conventional components. Thus, each heating element 31 optionally and preferably has a hollow casing 31a which has a flat upper face 31b and is otherwise convex in cross-section. Heating wire 32 extends through said casing 31a.

Figures 5, 6:
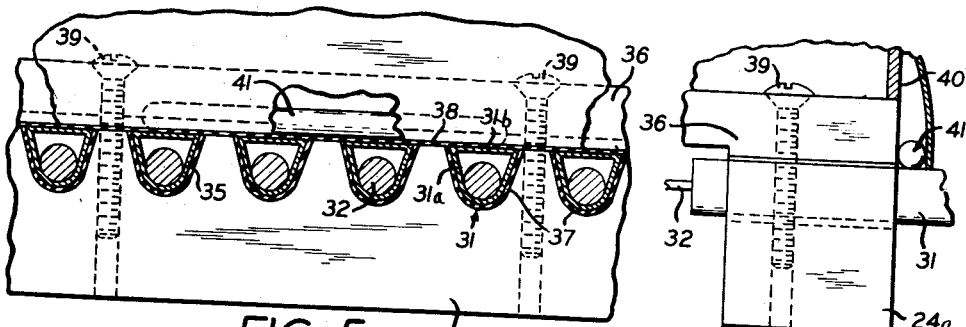
Fig. 5 is a fragmentary section on line 5—5 of Fig. 1.
Fig. 6 is a side elevation of the detail shown in Fig. 5.

As is shown in detail in Figs. 3, 5 and 6, the front wall of the hollow, rectangular cross-piece 24 is in the form of a laterally extending, relatively thick block 24a. This block 24a has a plurality of laterally spaced notches 35 extending downwardly from the top edge thereof. Said notches 35 extend from front to rear of block 24a and correspond in shape to the shape of casings 31a. Said casings 31a extend from frame opening 26 into and through notches 35. The top wall 36 of cross-piece 24, which is secured to block 24a by screws 39, closes the tops of notches 35.

Figure 7:
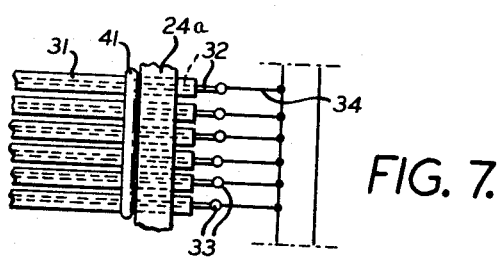
Fig. 7 is a fragmentary top plan view and also shows diagrammatically some of the electrical connections of the device.

As shown in Figs. 3 and 5, the heating wire 32 extends rearwardly of block 24a and of casing 31a and connects with a terminal 33. These terminals 33 are connected to any appropriate wiring 34 shown schematically in Fig. 7.

As an important feature of the invention, each notch 35 is sealed, and a further seal is provided between the upper face of block 24a and the top wall 36 of cross-piece 24.

The sealing material may be any suitable pliable material which is resistant to the cooking heat of the stove and which is resistant to moisture, fats and grease. For example, the sealing compound may take the form of any appropriate silicone sealing compound. Optionally, the sealing compound may be Silastic 125 and 182, manufactured by Dow-Corning Corp.

As shown in the detail view of Fig. 5, the sealing compound is preferably applied in the form of a sealer 37 extending around each heating element casing 31a and hence sealing the space between casing 31a and notch 35. Said sealing material 37 also extends over the top surface 31b of casing 31a. Optionally and preferably, before block 24a is secured to top wall 36, a further sealer 38 is applied over the whole top of block 24a. Figs. 5 and 6 show in phantom view the machine screws 39 used to secure top wall 36 tightly to block 24a.

Optionally, the front ends of the heating elements may be located and sealed similarly in block 23a, which serves as the front wall of cross-piece 23. However, the sealing at block 23a is of somewhat less importance in the event that all the electrical connections are at the rear of the device. While the exact details of the wiring of this device form no part of my invention, in my preferred embodiment all of the wiring is at the rear of the device.

Referring further to the control unit 27, this is provided with a laterally and vertically extending partition wall 40, located just behind the front panel 28 and above the open bottom of the control unit and resting upon the top wall 36 of cross-piece 24. The partition wall 28 extends forwardly of partition wall 40 and extends to the top surfaces 31b of elements 31, being at that point spaced slightly in front of wall 36.

A laterally extending, elongated thermostat element 41 is located between the bottom extension of panel 28 and partition wall 40 and rests directly upon the top surfaces 31b of heating elements 31.

Accordingly, said thermostat element 41, which may be of any appropriate conventional type, rests directly upon elements 31 and hence is in direct heat contact therewith.

In other words, there is no air space between the thermostatic element 41 and the heating elements, but at the same time the thermostat element is completely protected from moisture and from the fats and greases which may be liberated from food during the cooking operation. The heating element 41 is directly responsive to the heat of the heating elements 31, so that the device is accurately directly responsive to the surface cooking temperature of the heating elements 31. This is in contrast with conventional practice, wherein the thermostat element is separated by air or the like from the elements whose temperature is to be measured, causing inaccuracies depending upon the dissipation of heat in the air separating the thermostat element from the heating element.

Said thermostat element 41 may be of any appropriate type. Optionally, and without limitation thereto, said thermostat element 41 may be tubular and may contain a liquid which expands and contracts according to the temperature, and which may be connected to any appropriate control mechanism (not shown). By way of example, and without limitation thereto, said thermostat element 41 may be the temperature responsive element element of a unit known as Model EA3, manufactured by Robertshaw-Fulton Controls Company.

By way of illustration, a number of controls are shown as mounted upon the front face of panel 28. These controls include timer 42. As shown, also, the stove is optionally divided into a left-hand unit and a right-hand unit, each of which has independent controls. Each unit in turn has a left-hand section with a pilot lamp 43 and a right-hand section with a pilot lamp 44, as well as an "off" switch button 45, switch button 46 if only the left section is to be "on," switch button 47 if only the right section is to be "on" and switch button 48 if both sections are to be "on" at the same time. These controls, which may be modified in any suitable way, are connected in any appropriate circuit with the heating wires 32 and a source of electric power. The circuit of each stove section includes a thermostat control knob 49 for regulating the cut-off temperature of the system. Thus, said knob 49 optionally has a low heat setting and a high heat setting.

Optionally, there may be an individual thermostat element 41 for each stove section and resting upon a plurality of the heating elements 31 of said stove section. This is indicated in Fig. 5 of the drawing. Each thermostat element 41 may control the thermostat for its corresponding stove section.

As a further important feature of the invention, a griddle plate G, preferably made of metal, may be placed directly upon the heating elements 31 of the stove. Preferably, as shown in Figs. 1 and 2, griddle plate G substantially covers the heating elements 31 of one of the units, shown illustratively as the left-hand unit. This makes it possible to cook certain food, such as hamburgers, directly upon the exposed elements 31 of the right-hand unit and to cook other food, such as eggs, upon griddle plate G on the left-hand unit.

In accordance with this invention it is unnecessary to provide a thermostatic control upon or within griddle plate G, and it is sufficient to rely upon the thermostat control elements 41 incorporated in the stove. If no griddle plate G is mounted upon the heating elements 31, as shown illustratively in the right-hand unit in Figs. 1 and 2, the thermostatic control serves primarily to establish an upper heat limit and is not intended or needed to be a precise control.

Thus, in the case of the right-hand unit, without griddle plate G, when the upper limit heat setting of the thermostat control is reached and the current to the heating elements 31 is cut off, the heating elements 31 continue to be heated as the result of the flow of heated air therethrough (the bottom frame may be provided with any suitable air vents to permit the circulation of air to the heating elements 31).

When the heating elements 31 finally cool to the lower limit setting of the thermostat and current begins to be supplied to the elements 31, the elements initially continue to cool as the result of the flow of cool air past the heating elements. From this it follows that on a nominal thermostat setting of 600°, by way of example, there may be an approximate 50° spread between the upper and lower heat limits of elements 31. This is sufficiently accurate for the broiling of meats directly upon the heating elements 31, and the important consideration is that there is a maximum limit to the heating of elements 31.

In contrast, in the case of the left-hand unit of the stove, with griddle plate G illustratively mounted thereon, the variation in heat of elements 31 may be as little as approximately 5° even with the use of ordinary commercial thermostat controls. This is because griddle plate G blocks off air circulation past the elements 31 and also serves as a large metal mass which stores a large quantity of heat. Therefore, when the current cuts off at the upper thermostat setting, the metal mass of griddle plate G immediately absorbs heat from elements 31 and quickly reduces the temperature to the lower limit setting of the thermostat. At the lower limit setting of the thermostat, when current begins to be supplied to elements 31, the griddle plate G continues to release heat to elements 31 and prevents their cooling any substantial amount below the lower limit setting of the thermostat.

The result is to make it possible to use an inexpensive, readily cleaned griddle plate G, with the thermostat control being supplied by the stove itself.

While I have disclosed a preferred embodiment of my invention, and have indicated various changes, omissions and additions which may be made therein, it will be apparent that various other changes, omissions and additions may be made therein, without departing from the scope and spirit thereof.

I claim:

1. An electric cooking unit comprising a base frame and a top frame, said base frame being of hollow rectangular shape and having an open top and having opposed side walls, each said side wall having an elongated channel near the top thereof, said channel extending to the top of said side wall near the front thereof, an electric heating unit mounted upon said top frame, said top frame having a pair of rollers extending outwardly of each side thereof, said top frame being adapted to be mounted upon said bottom frame with said rollers slidably positioned within the respective channels and with the sides of said top frame located inwardly of said side walls, said rollers being adapted to be located rearwardly of the top openings of said channels, said top frame being adapted to be moved forwardly so as to bring the front rollers out of the respective top openings of said channels and to permit said top frame to be swung about the lateral axis of said rear rollers as pivots, said rear rollers being further adapted to be moved forwardly and upwardly out of said channel top openings for complete separation of the two frames.

2. An electrified cooking grate comprising a frame having a central opening having opposed end walls, said end walls each having a plurality of spaced apertures, a plurality of heating elements each comprising a generally straight hollow metal tube, containing a wire, said tubes extending across said opening in spaced, generally parallel relationship with the ends of each tube respectively extending into apertures of the respective end walls, and means sealing said tubes within said apertures against the passage of grease, liquids and the like through said apertures, the upper surfaces of said tubes being generally coplanar to provide a cooking surface, the space between, immediately above and immediately below said tubes being unobstructed to permit placing food directly upon said cooking surface and to permit free flow of air around said tubes.

3. An electrified cooking grate comprising a frame having a central opening having opposed end walls, said end walls each having a plurality of spaced apertures, a plurality of heating elements each comprising a generally straight hollow metal tube containing a wire, said tubes extending across said opening in spaced, generally parallel relationship with the ends of each tube respectively extending into apertures of the respective end walls, means sealing said tubes within said apertures against the passage of grease, liquids and the like through said apertures, the upper surfaces of said tubes being generally coplanar to provide a cooking surface, the space between, immediately above and immediately below said tubes being unobstructed to permit placing food directly upon said cooking surfaces and to permit free flow of air around said tubes, current supply means for said wires, said current supply means including control means for limiting current flow through said wires so as to cut off current to said wires at pre-set upper limit temperature of said control means, and a heat-conducting griddle plate resting upon said upper surfaces of said tubes and out of contact with said control means.

4. An electrified cooking grate comprising a frame having a central opening having opposed end walls, a plurality of heating elements each comprising a generally straight hollow metal tube containing a wire, the peripheral wall of each said tube having a generally planar upper portion and a generally convex lower portion connecting with the side edges of said upper portion, said end walls each having a plurality of spaced through notches extending to the upper edges thereof, each said notch corresponding in shape to the shape of said tube lower peripheral wall portion, said tubes extending across said opening in spaced, generally parallel relationship with the ends of each tube respectively extending through notches of the respective end walls, a plate overlying and abutting the top of each end wall and completely covering the top of each notch, the length of each notch being relatively great in relation to the width and height thereof, and means sealing the lower peripheral portions of said tubes against said notches and the upper peripheral portions of the surfaces of said tubes against said plate against the passage of grease, liquids and the like through said notches, the upper surfaces of said tubes being generally coplanar to provide a cooking surface, the space between, immediately above and immediately below said tubes being unobstructed so as to permit placing food directly upon said cooking surface and to permit for free flow of air around said tubes.

5. An electrified cooking grate comprising a frame having a central opening having opposed end walls, said end walls each having a plurality of spaced apertures, a plurality of heating elements each comprising a generally straight hollow metal tube containing a wire, said tubes extending across said opening in spaced, generally parallel relationship with the ends of each tube respectively extending into apertures of the respective end walls, means sealing said tubes within said apertures against the passage of grease, liquids and the like through said apertures, the upper surfaces of said tubes being generally coplanar to provide a cooking surface, the space between, immediately above and immediately below said tubes being unobstructed to permit placing food directly upon said cooking surfaces and to permit free flow of air around said tubes, and a heat-conducting griddle plate resting upon said upper surfaces of said tubes and out of contact with said control means.

6. An electrified cooking grate comprising a frame having a central opening having opposed end walls, said end walls each having a plurality of spaced apertures, a plurality of heating elements each comprising a generally straight hollow metal tube containing a wire, said tubes extending across said opening in spaced, generally parallel relationship with the ends of each tube respectively extending into apertures of the respective end walls, means sealing said tubes within said apertures against the passage of grease, liquids and the like through said apertures, the upper surfaces of said tubes being generally coplanar to provide a cooking surface, the space between, immediately above and immediately below said tubes being unobstructed to permit placing food directly upon said cooking surfaces and to permit free flow of air around said tubes, and current supply means for said wires, said current supply means including control means for limiting current flow through said wires so as to cut off current to said wires at pre-set upper limit temperature of said control means.

References Cited in the file of this patent

UNITED STATES PATENTS

| 1,694,762 | Ackerman | Dec. 11, 1928 |
| 2,311,087 | Sandell | Feb. 16, 1943 |
| 2,702,848 | Scofield et al. | Feb. 22, 1955 |
| 2,785,266 | Lewis et al. | Mar. 12, 1957 |
| 2,817,744 | Free | Dec. 24, 1957 |
| 2,856,502 | Wolf | Oct. 14, 1958 |